(No Model.)
J. S. DUNLAP.
COFFEE POT, &c.
No. 582,188. Patented May 11, 1897.
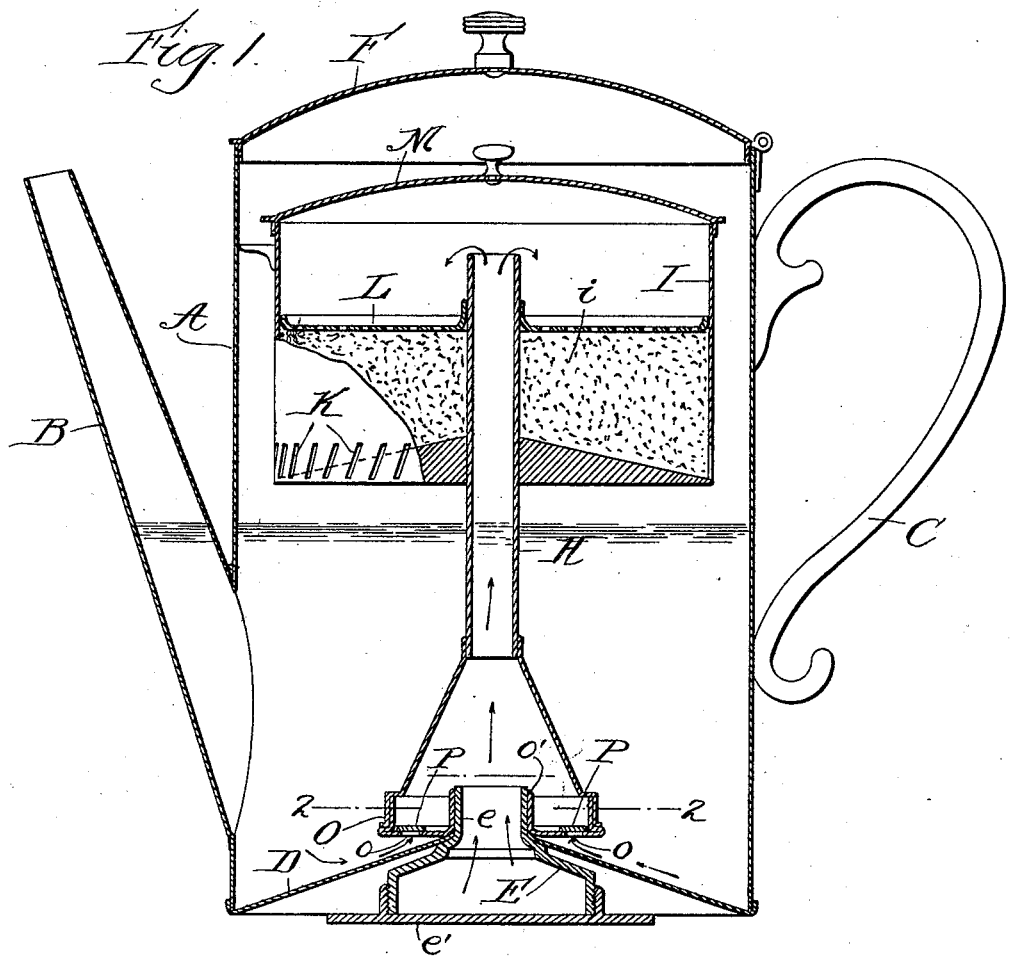
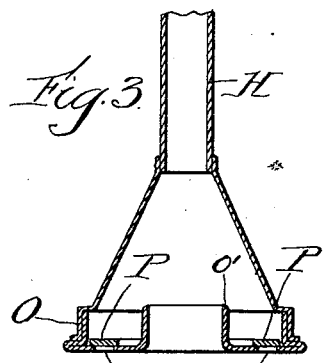
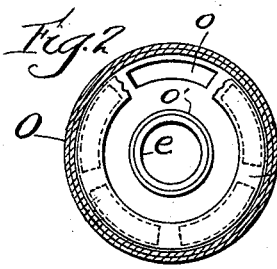
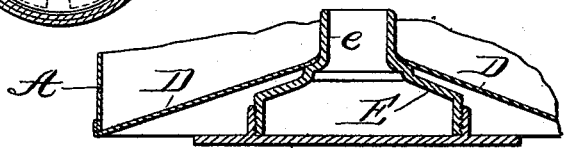
Witnesses
Inventor
John S. Dunlap
By Nieu & Hill
Attys.

UNITED STATES PATENT OFFICE.

JOHN S. DUNLAP, OF CHICAGO, ILLINOIS.

COFFEE-POT, &c.

SPECIFICATION forming part of Letters Patent No. 582,188, dated May 11, 1897.

Application filed January 25, 1897. Serial No. 620,622. (No model.)

*To all whom it may concern:*

Be it known that I, JOHN S. DUNLAP, a citizen of the United States of America, residing at Chicago, county of Cook, and State of Illinois, have invented certain new and useful Improvements in Coffee-Pots and other Vessels, of which the following is a description.

Referring to the accompanying drawings, wherein like reference-letters indicate like or corresponding parts, Figure 1 is a vertical section of my improved vessel. Fig. 2 is a horizontal section of the vertical tube in line 2 2 of Fig. 1. Fig. 3 is a view of the vertical tube removed from the vessel and; Fig. 4 is a part of the vessel, showing the vertical tube removed.

In the preparation of coffee for the table, as well as infusions generally, it has been found that better results are secured by spraying water over the coffee, gradually increasing the temperature and permitting it to percolate through, carrying with it the desirable ingredients sought. In this method the coffee or other material is preferably conveniently located above the body of the liquid which is caused to circulate, as hereinafter described.

The object of my invention is to produce a simple, durable, and efficient device for this purpose at a small cost.

To this end it consists in the construction and combination of parts shown and described, and particularly pointed out in the claims.

In the drawings, A represents the outer shell of a coffee-pot, provided with the spout B and handle C.

The bottom D of the pot is preferably conical, as shown, though such form is not necessary to the successful operation of the device.

A smaller vessel or cup E is secured to the bottom D, terminating in an upwardly-extending tube or neck e, opening into the interior of the pot. In smaller vessels the bottom e' of the cup E preferably extends below the bottom D in order that the liquid in the cup E may be heated more rapidly than the liquid in the vessel A when the vessel is placed on a stove or other heating-surface. In larger vessels for restaurants, &c., where the heat is secured by means of steam or other pipes, such construction may be varied so long as the primary object named is kept in view. A cover F is provided for the vessel.

A vertical tube for use with the vessel described is preferably formed as follows: A tube H supports near its top a receptacle I, adapted to contain the coffee or other material from which the infusion is to be made, as at i. The bottom is preferably conical, as shown, and is provided with a series of fine slotted perforations K, which permit the infusion to escape downward to the body of liquid below. A perforated annular plate or cover L is adapted to be placed upon the top of the body of coffee in the receptacle, which receptacle is also provided with a suitable cover M.

The lower part of the tube has an enlarged base O, which is annular in form to inclose the tube e, and between the said tube or neck e and the outer ring of the base O is positioned an annular plate P, covering a series of openings o in the bottom O, thus forming a very simple and effective automatic gravity-valve. The tube or neck O' of the bottom O snugly fits the exterior of the tube or neck e to form a friction joint or connection.

The mode of operation is as follows: The vertical tube H is placed in position, as shown, Fig. 1, the water in the vessel filling it to a point below the bottom of the receptacle I and filling the tube to an equal height. The coffee or other material is then placed in the receptacle, as at i, and the perforated cover placed in position. The pot then being placed on a stove or other heated surface, the water in the cup or vessel E becomes quickly heated and rising in the tube overflows the top upon the contained material in the vessel I, filtering downward and escaping through the slotted apertures K. This action causes the water outside the tube to operate the valve P and thus secure entrance to the tube to supply the deficit. As the water in the tube always heats more rapidly than that in the pot or vessel A, a constant circulation is kept up, the water continually passing to the top of the tube and percolating downward through the coffee or other material, thus securing a most perfect infusion.

The same principle with very slight modifications may be employed for various purposes besides making infusions. Thus fine laces and other delicate materials may be thoroughly cleaned by this means, &c. Hence I do not wish to be understood as limiting myself to the single use for making infusions. Neither do I wish to be limited to the exact construction shown, the broad idea of my invention resting in the construction of a device, for the purpose named and analogous use, in which the difference secured in the temperature of the water in the tube and in the pot or vessel, in combination with an automatic valve, insures a perfect circulation.

Having thus described my invention, what I claim as new, and desire to secure by Letters Patent, is—

1. A coffee-pot or other vessel provided at its bottom with a smaller vessel opening upward into the pot, and so constructed that its contents will be more rapidly heated than those of the pot, in combination with a vertical tube, adapted to discharge at its top into an elevated receptacle provided with a perforated bottom, the said tube at its bottom being connected to the outlet of the smaller vessel, and a valve controlling the passage of the liquid from the pot into the tube, substantially as described.

2. In a coffee-pot or other vessel the pot A provided with a vessel, E, in combination with a vertical tube, H, elevated receptacle I, annular bottom, O, provided with openings, o, and gravity-valve, P, substantially as described.

3. In a coffee-pot or other vessel, the pot, A, provided with a vessel, E, in combination with a vertical tube H, elevated receptacle, I, perforated plate, L, cover M, annular bottom, O, provided with openings, o, and valve, P, substantially as described.

4. A coffee-pot or other vessel consisting of the vessel A, provided with the vessel, E, in combination with the vertical tube H, receptacle, I, and the valve, P, controlling the passage of the fluid in the pot into the tube, substantially as described.

JOHN S. DUNLAP.

Witnesses:
JOHN W. HILL,
L. A. GARDINER.